J. W. JONES.
CENTRIFUGAL TACHOMETER.
APPLICATION FILED APR. 24, 1918.
1,330,120.
Patented Feb. 10, 1920.
2 SHEETS—SHEET 1.
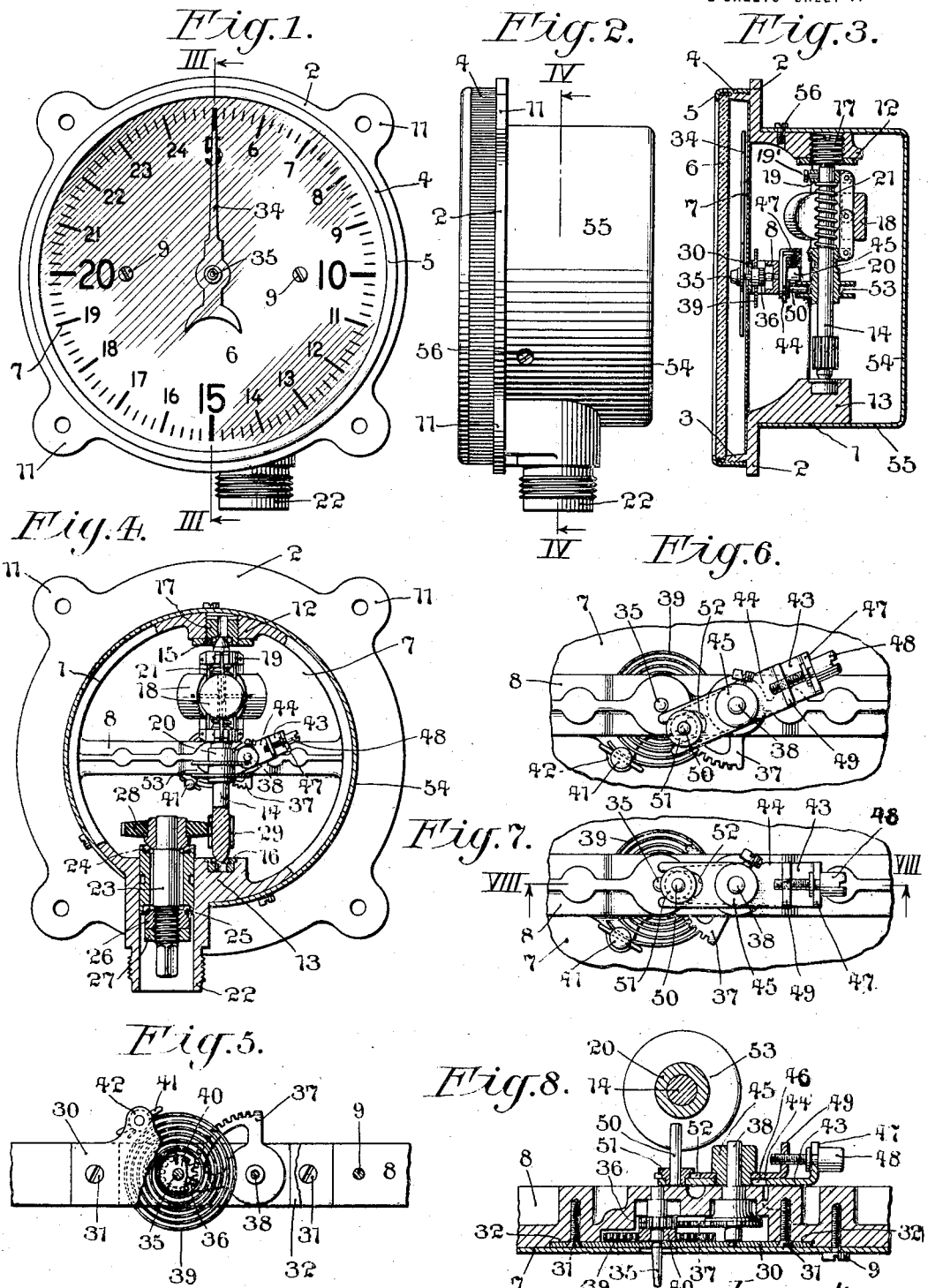

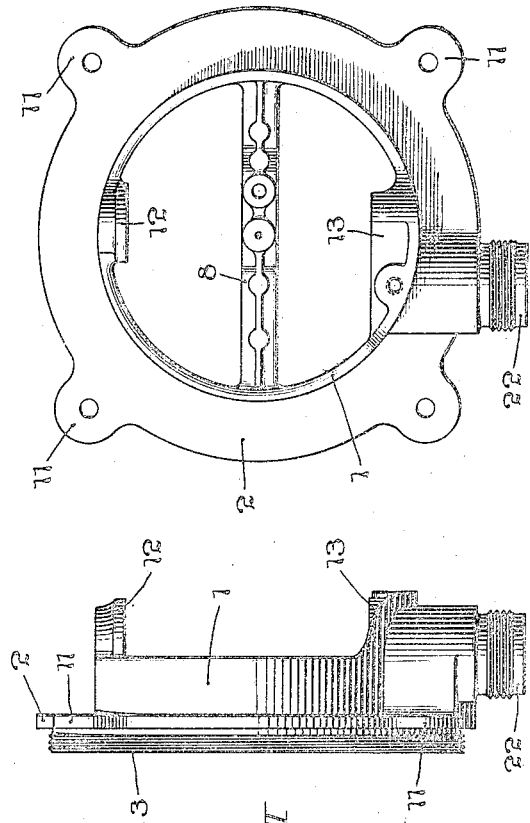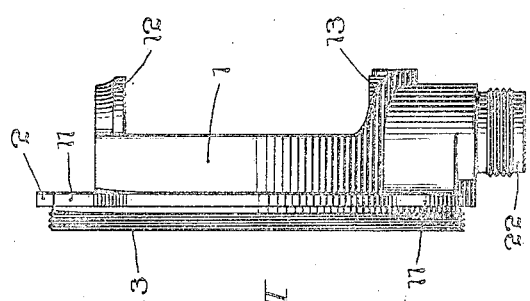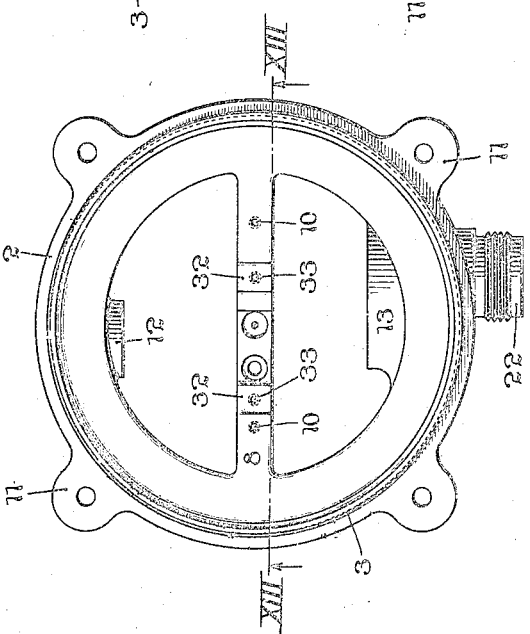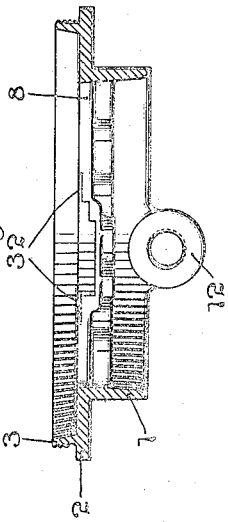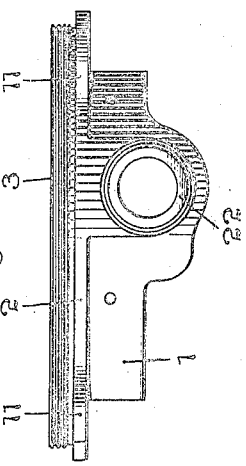

UNITED STATES PATENT OFFICE.

JOSEPH W. JONES, OF NEW YORK, N. Y.

CENTRIFUGAL TACHOMETER.

1,330,120.   Specification of Letters Patent.   Patented Feb. 10, 1920.

Application filed April 24, 1918. Serial No. 230,440.

*To all whom it may concern:*

Be it known that I, JOSEPH W. JONES, a citizen of the United States, and resident of the borough of Manhattan, in the city and State of New York, have invented a new and useful Improvement in Centrifugal Tachometers, of which the following is a specification.

The object of my invention is to provide certain improvements in the construction, arrangement and operation of the several parts of a centrifugal tachometer whereby an instrument may be produced which will be extremely light and accurate; in which the governor mechanism may be run at a very high speed; in which a uniform scale of considerable length and openness may be used on the dial; in which the gears for enabling the instrument to be run at cam shaft speed are embodied in the instrument itself; and in which an integral frame of very light and simple construction is provided for mounting the several parts.

A practical embodiment of my invention is represented in the accompanying drawings in which, Figure 1 represents the tachometer in front elevation.

Fig. 2 represents the same in side elevation.

Fig. 3 is a sectional view taken in the plane of the line III—III of Fig. 1, looking in the direction of the arrows.

Fig. 4 is a sectional view taken in the plane of the line IV—IV of Fig. 2, looking in the direction of the arrows.

Fig. 5 is a detail section on an enlarged scale, looking toward the front face of the frame bridge, a portion of the bridge plate being broken away.

Fig. 6 is a detail section looking toward the back face of the frame bridge, the parts being shown in the positions which they assume when the instrument is at rest.

Fig. 7 is a similar view showing the positions of the parts when the instrument is being driven at a certain speed.

Fig. 8 is a detail sectional view taken in the plane of the line VIII—VIII of Fig. 7, looking in the direction of the arrows.

Fig. 9 represents the frame in front elevation.

Fig. 10 represents the same in side elevation.

Fig. 11 represents the same in back elevation.

Fig. 12 represents the same in bottom elevation, and

Fig. 13 is a sectional view taken in the plane of the line XIII—XIII of Fig. 9, looking in the direction of the arrows.

The integral frame which forms the support for the various parts comprises a cylindrical back ring 1, a lateral flange 2 and a cylindrical front ring 3, of greater diameter than the back ring 1. The front ring 3 is exteriorly screw-threaded to receive the interiorly screw-threaded ring 4, which ring 4 is provided with an inwardly turned flange 5 arranged to hold the transparent window 6 between it and the front ring 3 of the frame.

The dial 7 of the instrument fits within the front ring 3 and rests against the front face of the lateral flange 2 of the frame. This dial is provided with a uniform scale of considerable length and openness so as to be easily read. A bridge 8, integral with the frame, extends diametrically across the back ring of the frame, the front face of which bridge is flush with the front face of the lateral flange 2 and it is provided with a transverse stepped recess for the purpose to be hereinafter explained. The bridge 8 is also provided with back lugs connected by a web for reducing the weight of the bridge as much as possible without sacrificing its strength.

Screws 9 serve to secure the dial 7 to the frame, the said screws entering the holes 10 in the frame bridge 8. The lateral flange 2 of the frame may be provided with outer lugs 11 for receiving screws, not shown, to secure the instrument to its desired support.

The back ring 1 of the frame is provided with oppositely arranged rearwardly extended upper and lower lugs 12, 13, forming bearing supports for the ends of the governor shaft 14. This governor shaft 14 has its upper and lower ends mounted in suitable ball bearings 15, 16, the upper ball bearing being located in an adjusting screw 17, whereby the supports for the governor shaft may be adjusted to the greatest degree of accuracy, and adjustments for wear may be easily made.

The governor 18 is adjustable along the shaft 14 and may be provided with the usual fixed sleeve 19 and movable sleeve 20, together with the interposed coil spring 21. A set screw 19* serves to fasten the sleeve 19 to the shaft 14 in the adjusted position.

The back ring 1 of the frame is also provided with an outwardly extended hollow lug 22 which forms a bearing support for the drive shaft 23, which shaft is parallel with and offset from the governor shaft and is mounted in suitable upper and lower ball bearings 24, 25, the lower ball bearing being provided with an adjustable cone 26 and lock nut 27 accessible through the outer end of the hollow lug 22, whereby the drive shaft may be adjusted to the utmost accuracy and adjustments for wear may be easily made.

A reduction gear connection is provided between the drive shaft 23 and governor shaft 14. In the present instance a fiber gear 28 is shown on the inner end of the drive shaft 23, and the governor shaft 14 is shown as having a pinion 29 cut therein. By this means the governor shaft may be driven at a very high rate of speed, as for instance, the cam shaft speed, the gears for insuring this drive being carried within the frame of the instrument.

The bridge 8 is at right angles to the governor shaft 14, which bridge supports the following parts. A bridge plate 30 is secured by screws 31 to the front face of the bridge 8, with the front face of the bridge plate flush with the front face of the bridge, the shallow steps 32 of the transverse recess serving to receive the opposite ends of the bridge plate 30, and the holes 33 serving to receive the screws 31. The pointer 34, which travels over the face of the dial 7, is carried by a rock shaft 35 mounted in suitable bearings in the bridge 8 and bridge plate 30. This rock shaft is provided with a pinion 36 which is engaged at all times by a gear segment 37 fixed to the lever shaft 38. This lever shaft is mounted in the bridge 8 and bridge plate 30, parallel with the pointer shaft. To prevent back lash between the gear segment 37 and pinion 36 and to prevent the wavering of the pointer 34, I provide a light coil spring 39, the inner end of which is secured to a collar 40 fixed on the pointer shaft 35, and the outer end of which spring is adjustably fastened to the bridge plate 30, by a clamp screw 41 engaging a lug 42 of the bridge plate.

The calibrating lever to be now described is fixed to the rear end of the shaft 38 along the back of the bridge 8, which lever comprises front and rear members 43, 44, the rear member being fixed to a sleeve 45 secured to the shaft 38 and the front member having a sliding adjustment with respect to said shaft 38, as follows. The front member 43 is provided with an elongated groove 46 through which the sleeve 45 passes. This front member 43 has a rearwardly turned arm 47 in which is rotatably mounted an adjusting screw 48, the screw threaded end of which engages a rearwardly turned arm 49 of the rear member 44 of the calibrating lever. The front member 43 is provided with a rearwardly extended pin 50 carried by a sleeve 51 slidable in an elongated groove 52, in the rear member 44, as the members are adjusted by the turning of the screw 48 to move the pin 50 bodily with the greatest accuracy toward and away from the axis of the lever shaft 38. This pin 50 projects into the annular groove 53 in the movable member 20 of the governor shaft and is located on substantially the pitch line of the gear segment 37.

A cap 54 for inclosing the parts has its side walls 55 arranged to snugly fit the cylindrical back ring 1 of the frame, said walls being cut away to embrace the drive shaft lug 22. Screws 56 may be provided for securing the cap to the frame.

From the above description, it will be seen that the instrument is very simple in its construction; that access to the parts may be very easily obtained; that a very rigid support for the different parts is provided; and that the arrangement of the calibrating lever permits the adjustment to the greatest nicety of the relationship between the pointer and the governor shaft.

It will also be seen that the pointer and lever shafts are parallel and located at right angles to the parallel drive and governor shafts.

What I claim is:

1. In a centrifugal tachometer, a casing inclosing a dial bearing a scale having predetermined uniformly spaced speed indicating marks throughout its length, a calibrating lever, intergeared pointer and lever shafts, a governor, its shaft, a pin carried by the calibrating lever, and means for adjusting both the pin and the governor whereby the pointer may be made to coincide with the said indicating marks at the indicated speeds.

2. In a centrifugal tachometer, a casing inclosing a dial bearing a scale having predetermined uniformly spaced speed indicating marks throughout its length, a pointer, a calibrating lever comprising relatively fixed and adjustable members, intergeared pointer and lever shafts, a governor, its shaft, a pin carried by the adjustable lever member, engaging and moved by said governor, and means for adjusting both the pin and the governor whereby the pointer may be made to coincide with the said indicating marks at the indicated speeds.

3. In a centrifugal tachometer, a dial bearing a scale having uniformly spaced speed indicating marks throughout, a calibrating lever, intergeared pointer and lever shafts, a governor, its shaft, a pin carried by the calibrating lever and engaged with the movable end of the governor for movement therewith but free to move at right angles therewith, means for adjusting the distance of the pin from the lever shaft, and means for adjusting the position of the stationary end of the governor along the governor shaft.

4. In a centrifugal tachometer, a dial bearing a scale having uniformly spaced speed indicating marks throughout, a calibrating lever, intergeared pointer and lever shafts, a governor, its shaft, a pin carried by the calibrating lever and engaged with the movable end of the governor for movement therewith but free to move at right angles therewith, the lever and pin being arranged to swing on each side of a plane perpendicular to the governor shaft in which plane the lever shaft is located, means for adjusting the distance of the pin from the lever shaft, and means for adjusting the position of the stationary end of the governor along the governor shaft.

5. In a centrifugal tachometer, a dial bearing a scale having uniformly spaced speed indicating marks throughout, a calibrating lever, intergeared pointer and lever shafts, a governor, its shaft, a pin carried by the calibrating lever and engaged with the movable end of the governor for movement therewith but free to move at right angles therewith, the lever and pin being arranged to swing on each side of a plane perpendicular to the governor shaft in which plane the lever shaft is located, means for moving the pin along a straight line extending through the lever shaft to adjust the distance of the pin from the lever shaft, and means for adjusting the position of the stationary end of the governor along the governor shaft.

In testimony, that I claim the foregoing as my invention, I have signed my name this 18th day of April 1918.

JOSEPH W. JONES.